United States Patent [19]

Lee

[11] Patent Number: 5,621,881
[45] Date of Patent: Apr. 15, 1997

[54] DRAM CONTROL DEVICE OF A CD GRAPHICS DECODER

[75] Inventor: Eui W. Lee, Seoul, Rep. of Korea

[73] Assignee: Goldstar Co., Ltd., Seoul, Rep. of Korea

[21] Appl. No.: 348,090

[22] Filed: Nov. 25, 1994

[30] Foreign Application Priority Data

Nov. 26, 1993 [KR] Rep. of Korea ............... 25334/1993

[51] Int. Cl.$^6$ ........................................... G06F 15/00
[52] U.S. Cl. ............. 395/501; 345/200; 365/189.01; 365/189.02
[58] Field of Search ........................ 395/162–166, 395/410, 421.01; 345/200, 185, 189, 190; 365/189.01, 189.02, 189.04, 189.05

[56] References Cited

U.S. PATENT DOCUMENTS

5,280,601  1/1994  Desai et al. ............... 365/189.02
5,321,651  6/1994  Monk ........................ 365/189.01

*Primary Examiner*—Kee M. Tung
*Attorney, Agent, or Firm*—Birch, Stewart, Kolasch & Birch, LLP

[57] ABSTRACT

A DRAM control device of a CD graphics decoder for reading and writing font data on a DRAM, which is made simple for fabricating the ASIC, allowing it made smaller permitting it applied to a compact disc player and a laser disc player.

11 Claims, 7 Drawing Sheets

DRAM CONTROL DEVICE OF A CD GRAPHICS DECODER

FIELD OF THE INVENTION

This invention relates to a DRAM control device of a CD graphics decoder for controlling to read and write font data in and on a DRAM according to instruction, more particularly to a DRAM control device in digital logic.

BACKGROUND OF THE INVENTION

A conventional DRAM control device for presenting image using font data through writing or reading font data according to instructions contained in a subcode from a CD is not favorable for making it smaller due to the complicated system that makes the ASIC of the system take much area. Therefore, a compact disc player or a laser disc player with the conventional DRAM control device in it has a problem of high cost.

SUMMARY OF THE INVENTION

The object of this invention devised for solving the foregoing problem is to provide a DRAM control device of a CD graphics decoder, which can make the CD graphics decoder smaller by providing the DRAM control device simple for making the ASIC.

These and other objects and features of this invention can be achieved by providing a DRAM control device of a CD graphics decoder, including a DRAM writing control part for generating and applying various writing control signals which generate writing address in a DRAM and control writing on the DRAM according to various instruction signals received from outside, a DRAM reading control part for generating and applying various reading control signals which generate reading address in the DRAM and control reading in from the DRAM according to various instruction signals received from outside, a first multiplexer for selecting and applying the writing and reading addresses and the various writing and reading control signals received from the DRAM writing control part and the DRAM reading control part in response to the control signal received from the DRAM writing control part, and a DRAM data interface part for presenting color data through applying pack data received from outside to the DRAM and receiving the data applied from the DRAM in response to various control signals received from the DRAM writing control part and the DRAM reading control part.

DETAILED DESCRIPTION OF THE PREFERRED EMBODIMENT

Of the signals recorded on a CD, there are digital signals of PIT like sound for controlling and marking for use at the time of reproduction besides of audio signals, and such signals recorded for controlling and marking are called subcodes.

Figure 1:
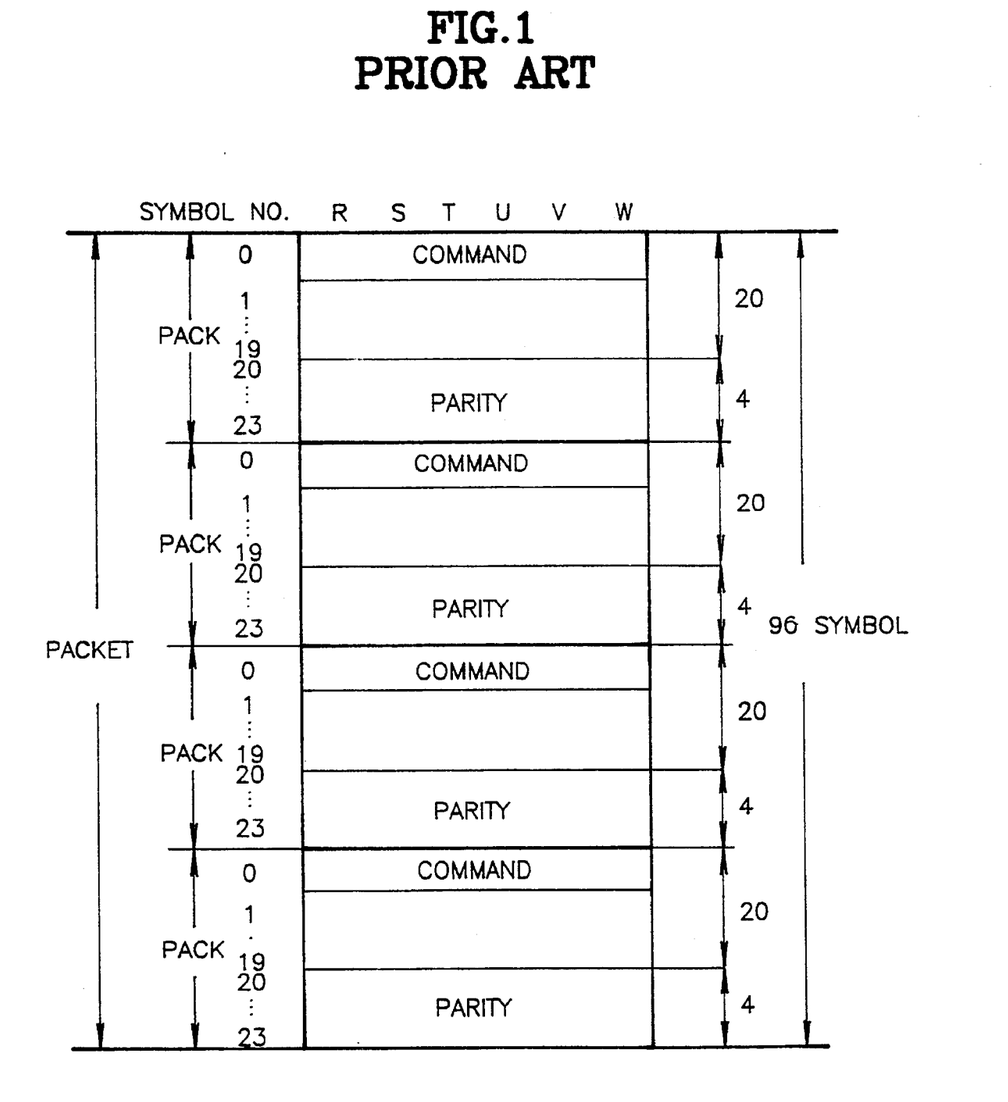
FIG. 1 shows a form of a subcode.

The subcode has 8 bits of P, Q, R, S, T, U, V, and W channels, of which the P signal is a flag indicating start of each track, the Q signal is a flag carrying out various controls. And the 6 bit signals of the R, S, T, U, V, and W channels are used for CD graphics, and the form of subcode of the R, S, T, U, V, and W signals includes, as shown in FIG. 1, 4 packs each having 24 6 bit symbols, making one subcode frame to have 96 symbols.

Figure 2:
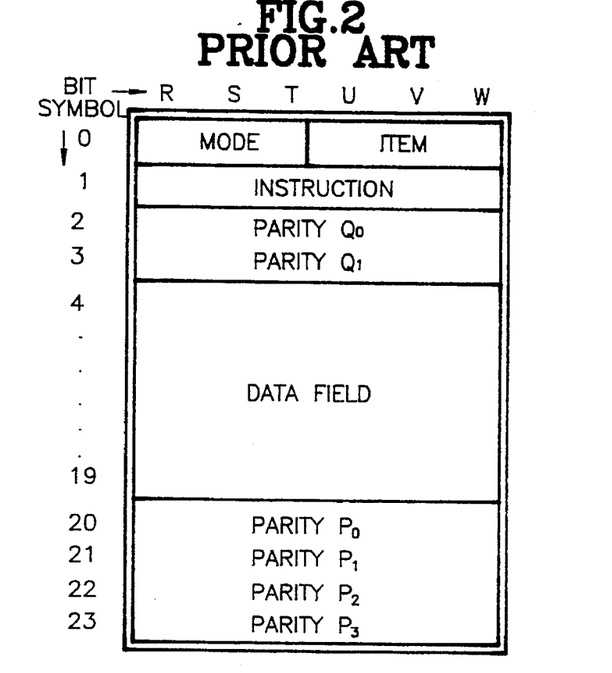
FIG. 2 shows structure of a pack.

Each pack is formed as shown in FIG. 2, which is to be explained hereinafter in detail.

First, the top symbol 0 having a mode and an item each with 3 bits indicates mode of the pack. That is, if the mode is '000' and the symbol is '000', it indicates that it is zero mode, if the mode is '001' and the symbol is '000', it indicates that it is line graphic mode, if the mode is '001' and the symbol is '001', it indicates that it is TV graphic mode, if the mode is '001' and the symbol is '010', it indicates that it is augmented TV graphic mode, if the mode is '001' and the symbol is '010', it indicates that it is MIDI mode, and if the mode is '111' and the symbol is '000', it indicates that it is user mode.

Of the 24 symbols of one pack, the second symbol of symbol 1 next to the top symbol 0, being an instruction, indicates a instruction for the pack to be carried out. The third, fourth, and from the 21st to 24th symbols, i.e., the symbols of 2, 3, 20, 21, 22, and 23, being parity symbols for correction of errors, classified into P parities and Q parities, of which two Q parities are added to the first and the second symbols of symbols 0 and 1, and P parities are added to the symbols from the first symbol of symbol 0 to the 20th symbol of symbol 19.

Finally, the 16 symbols from the 5th symbol of symbol 4 to the 20th symbol of symbol 19 are data areas having data required for carrying out a certain instruction.

On receiving a pack data as shown in FIG. 2, a CDG or a CDEG decoder composing a video text using subcode of R, S, T, U, V, and W, generates video data by decoding the instruction according to mode and carrying out the instruction.

In a CD graphics decoder presenting video data to a TV screen by receiving the subcode of R, S, T, U, V, and W and decoding instructions according to relevant modes, the TV graphics mode or the augmented TV graphics mode is used for presenting video data to a TV screen in the foregoing 6 kinds.

And the colors that the TV graphics mode can exhibit are 16 kinds and that of the augmented TV graphics mode are 256 kinds.

Figure 3:
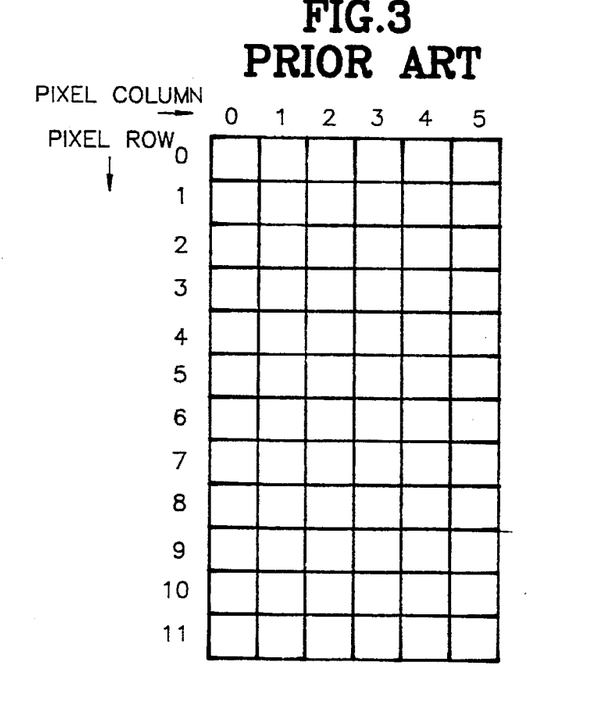
FIG. 3 shows structure of a font.
Figure 4:
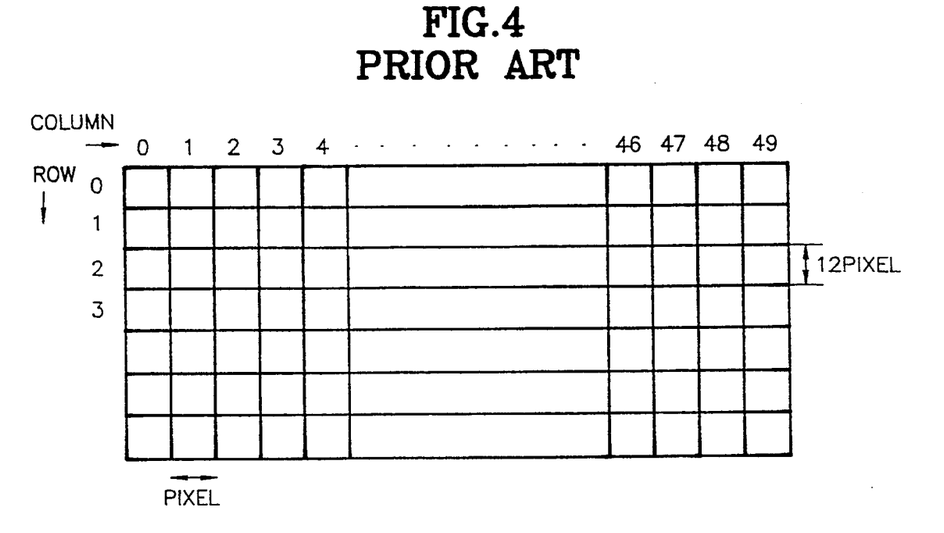
FIG. 4 shows structure of a screen area.

As shown in FIG. 3, a font format of the TV graphics mode has pixels in 6 columns and 12 rows, and as shown in FIG. 4, a screen format of the TV graphics mode has pixels in 50 columns and 18 rows. Herein, a graphic memory has such pixels at storage and the area shown on a screen is called a screen area. Accordingly, a screen area has horizontal 288×vertical 192 pixels and the graphic memory has 4 bits.

In the TV graphics mode, a scroll instruction moving the screen in four directions is carried out, for which a scroll pointer is used that indicates which pixel is at the most left side of the most upper side in font(1, 1). As for the scroll pointers, there are a PH(horizontal pointer) and a PV(vertical pointer).

Figure 5:
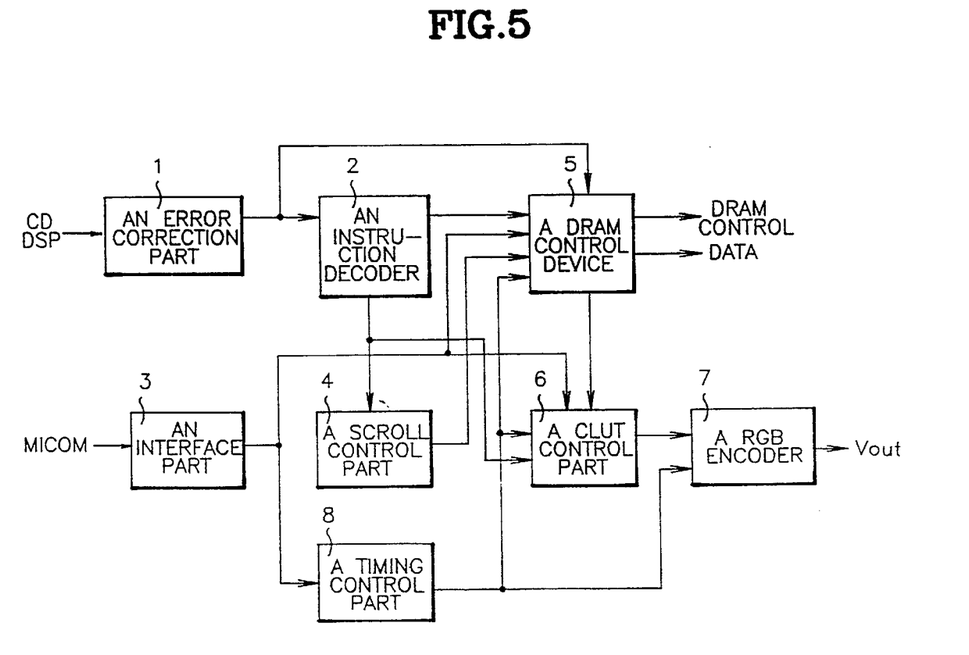
FIG. 5 is a system of CD graphics decoder having this invention applied thereto.

As shown in FIG. 5, the CD graphics decoder includes, an error correction part 1 for carrying out correction of errors of the P parities and the Q parities on receiving subcode signals applied from a CD digital signal processing(CD DSP) part, an instruction decoder 2 for decoding modes of the error corrected signals received from the error correction part 1 by symbol units, and decoding instructions based on the decoded modes, an interface part 3 for receiving instructions from a microcomputer MICOM and applying the received instructions to relevant parts, a scroll control part 4 for moving a screen in four directions in response to the instructions received from the instruction decoder 2, a timing control part 8 for generating a reading/writing signal and a composite SYNC in response to the relevant signals received from the interface part 3, a DRAM control device 5 for scrolling the screen by changing the address of DRAM based on the scroll output received from the scroll control part 4 in response to the instruction signal received from the instruction decoder 2 and the signals received from the interface part 3 and the timing control part 8, a CLUT control part 6 for storing colors fit for a CLUT(Color Look Up Table) in response to the signals received from the interface part 3, the DRAM control device 5 and the timing control part 8 according to the instruction received from the instruction decoder 2, and a RGB encoder 7 for generating video signals by broadcasting method, i.e., by the NTSC or the PAL based on the RGB(Red, Green and Blue) signals received from the CLUT control part 6 in response to the composite SYNC received from the timing control part 6.

Operation of the CD graphics decoder having the foregoing system is to be explained hereinafter.

Upon receiving a subcode from the CD DSP part, the error correction part 1 corrects the errors with P parities and Q parities and applies the corrected signal to the instruction decoder 2 by symbol units. The signal received from the error correction part 1 has the mode decoded in a pack structure as shown in FIG. 2 and the instruction decoded according to the decoded mode at the instruction decoder 2, and applied to the scroll control part 4, the DRAM control part 5 and the CLUT control part 6.

In this instant, the instruction from the microcomputer MICOM, matched at the interface part 3, applied to relevant parts, i.e., to the timing control part 8, the DRAM control part 5 and the CLUT control part 6.

The scroll control part 4, on receiving instruction from the instruction decoder 2, applies scroll signal for moving the screen in four directions to the DRAM control part device 5. The DRAM control device 5, changing the address of DRAM using the scroll signal received from the scroll control part 4, scrolls the screen and writes data on or reads in data from DRAM on receiving instruction applied from the instruction decoder 1.

And, on receiving the data the DRAM control device 5 has read in from the DRAM, the CLUT control part 6 has the CLUT data made into a color look up table and applies the table to the RGB encoder 7 for displaying font data on a screen area, and stores the colors in the CLUT on receiving instruction applied from the instruction decoder 1.

The RGB signals applied from the CLUT control part 6 together with the composite SYNC applied from the timing control part 8 are received, encoded to be generated into video signals of the NTSC method or the PAL method at the RGB encoder 7.

Herein, the timing control part 8 applies writing/reading signal to the DRAM control device 5 and the CLUT control part 6, and the composite SYNC to the RGB encoder 7.

Figure 6:
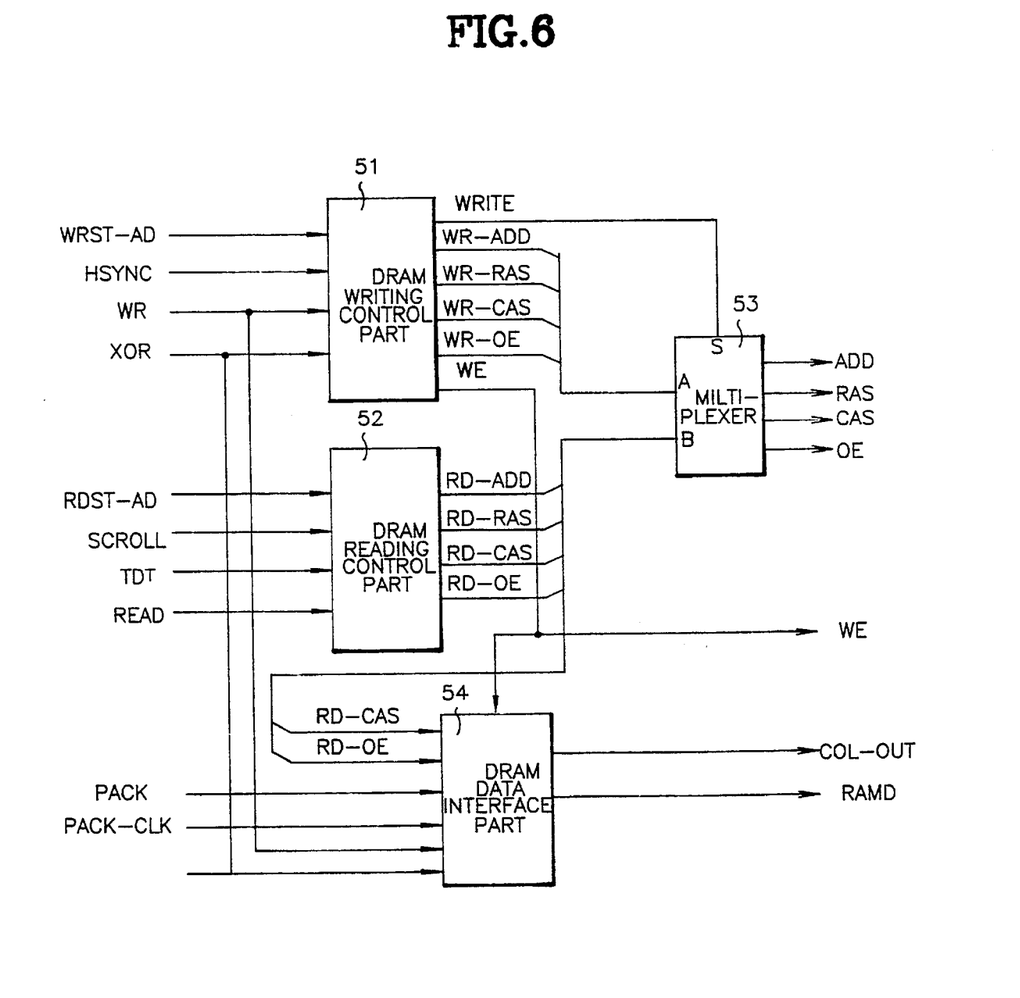
FIG. 6 is a system of a DRAM control device in accordance with this invention.

As shown in FIG. 6, the DRAM control device in accordance with this invention includes, a DRAM writing control part 51, a DRAM reading control part 52, a multiplexer 53, and a DRAM data interface part 54.

The DRAM writing control part 51 generates a DRAM writing address WR-ADD according to instruction signals WRST-AD, HSYNC, WR, and XOR received from outside, and generates and transmits writing control signals WRITE, WR-ADD, WR-RAS, W-ROE, and WE controlling writing on DRAM, and the DRAM reading control part 52 generates a DRAM reading address RD-ADD according to the instruction signals RDST-AD, SCROLL, VSYNC, and READ received from outside and generates and transmits reading control signals RD-ADD, RD-RAS, RD-CAS, and RD-OE controlling reading in from DRAM.

The multiplexer 53 selects the writing and the reading addresses WR-ADD, RD-ADD and the writing and the reading control signals ADD, RAS, CAS, and OE received from the DRAM writing control part 51 and the DRAM reading control part 52 in response to the control signals received from the DRAM writing control part, and transmits the selected address and signal.

The DRAM data interface part 54 applies the pack data PACK received from outside to DRAM and transmits color data COL-OUT on receiving data RAMD applied from DRAM in response to the control signals received from the DRAM writing control part 51 and the DRAM reading control part 52. That is, the DRAM data interface part 54 applies pack data received from outside to DRAM during a DRAM writing period carrying out writing operation on DRAM and transmits color data on receiving data applied from DRAM in response to the control signals received from the DRAM writing control part 51 and the DRAM reading control part 52.

Herein, the DRAM writing period is during a horizontal synchronization HSYNC period that is a blanking period of TV signals.

The system detail of the DRAM control device having the foregoing system is to be explained hereinafter, referring to FIGS. 7, 8, and 9.

Figure 7:
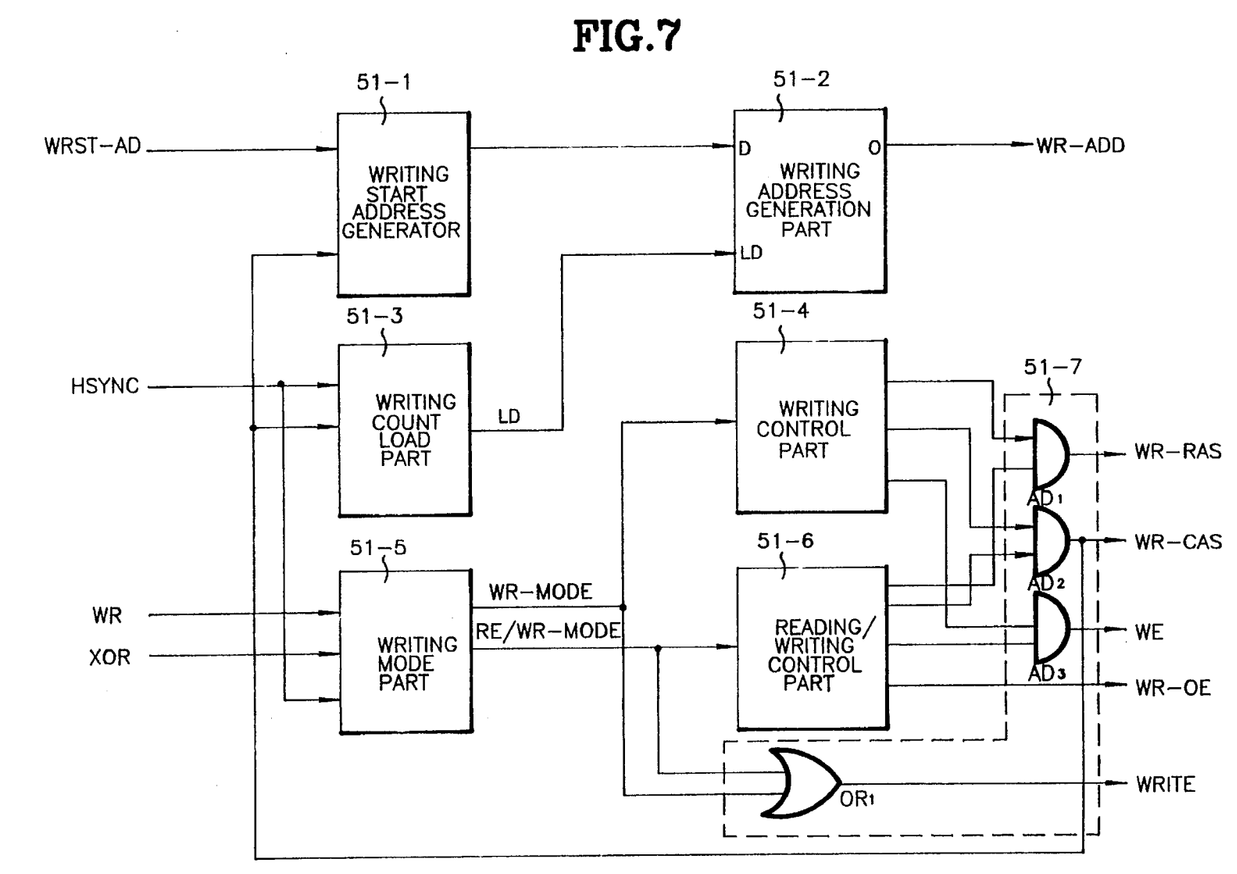
FIG. 7 is detail of the DRAM writing control part of FIG. 6.

As shown in FIG. 7, the DRAM writing control part 51 includes, a writing start address generator 51-1 for generating a writing start address WR-ADD at the time of starting according to a writing start address WRST-AD received from outside, and adding an offset address to the writing start address at every predetermined pixel and transmitting the address, a writing count load part 51-3 for generating load signals LD loading writing start address WR-ADD on every predetermined pixel using the horizontal synchronization signal HSYNC received from outside, a writing address generation part 51-2 for generating a DRAM writing address by loading the writing start address received from the writing start address generator 51-1 in response to the load signal LD received from the writing count load part 51-3, a writing mode part 51-5 for generating a writing mode signal RW-MODE indicating writing mode and a reading/writing mode signal RD/WR-MODE indicating reading/writing mode in response to a writing signal WR and an exclusive OR signal XOR received from outside synchronized to the horizontal synchronization signal, a writing control part 51-4 for generating a writing control signal controlling writing on DRAM in response to the writing mode signal WR-MODE received from the writing mode part 51-5, a reading/writing control part 51-6 for generating a reading/writing control signal controlling reading/writing of DRAM and a writing output enable signal in response to the reading/writing mode signal RD/WR-MODE received from the writing mode part 51-5, and a writing control signal generation part 51-7 for generating a writing row address strobe signal WR-RAS, a writing column address strobe signal WR-CAS, a writing enable signal WE, and a writing signal WRITE in response to the writing control signal and the reading/writing control signal received from the writing control part 51-4 and the reading/writing control part 51-6, respectively.

Herein, the writing start address generator 51-1 generates writing start address at starting according to the writing start address received from outside, and adds an offset address to the writing start address for a pixel corresponding to the number of pixels of one font column, i.e., for every sixth pixel and transmits the address.

And the writing count load part 51-3 generates a load signal LD for loading writing start address WR-ADD on a pixel corresponding to the number of pixels of one font column, i.e., on every sixth pixel on receiving the horizontal synchronization signal HSYNC received from outside.

Herein, the writing control signal generation part 51-7 includes, an OR gate OR1 for logical summation of the writing mode signal WR-MODE and the reading/writing mode signal RD/WR MODE received from the writing mode part 51-5, an AND gate AD1 for generating a writing row address strobe signal WR-RAS by logical multiplication of the signals received from the writing control part 51-4 and reading/writing control part 5-16, an AND gate AD2 for generating a writing column address strobe signal WR-CAS by logical multiplication of the signals received from the writing control part 51-4 and reading/writing control part 51-6, and an AND gate AD3 for generating a writing enable signal WE by logical multiplication of the signals received from the writing control part 51-4 and reading/writing control part 51-6.

Figure 8:
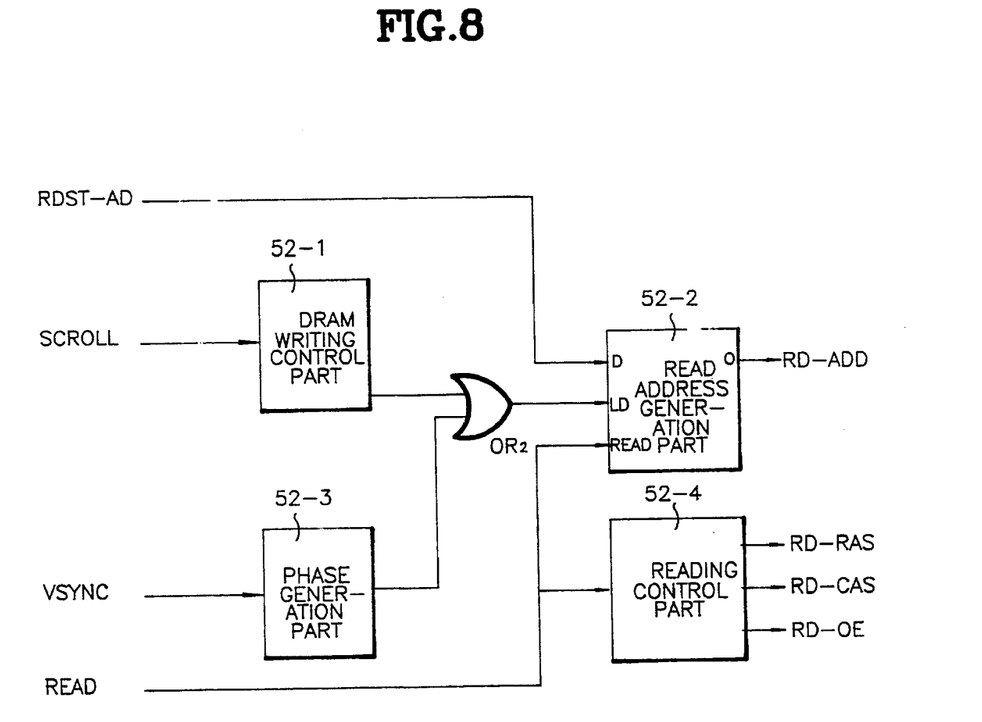
FIG. 8 is detail of the DRAM reading control part of FIG. 6.

As shown in FIG. 8, the DRAM reading control part 52 includes, a scroll load part 52-1 for generating a load signal according to a scroll signal SCROLL received from outside, a pulse generation part 52-3 for generating a pulse signal in response to a vertical synchronization signal received from outside, an OR gate OR2 for logical summation of the load signal and the pulse signal received from the scroll load part 52-1 and the pulse generation part 52-3 respectively, a read address generation part 52-2 for generating a DRAM reading address using the reading start address RDST-AD received from outside in response to a reading signal READ received from outside and a signal received from the OR gate OR2, and a reading control part 52-4 for applying a read row address strobe signal RD-RAS, a read column address strobe signal RD-CAS and a read output enable signal RD-OE to DRAM in response to the reading signal READ.

Figure 9:
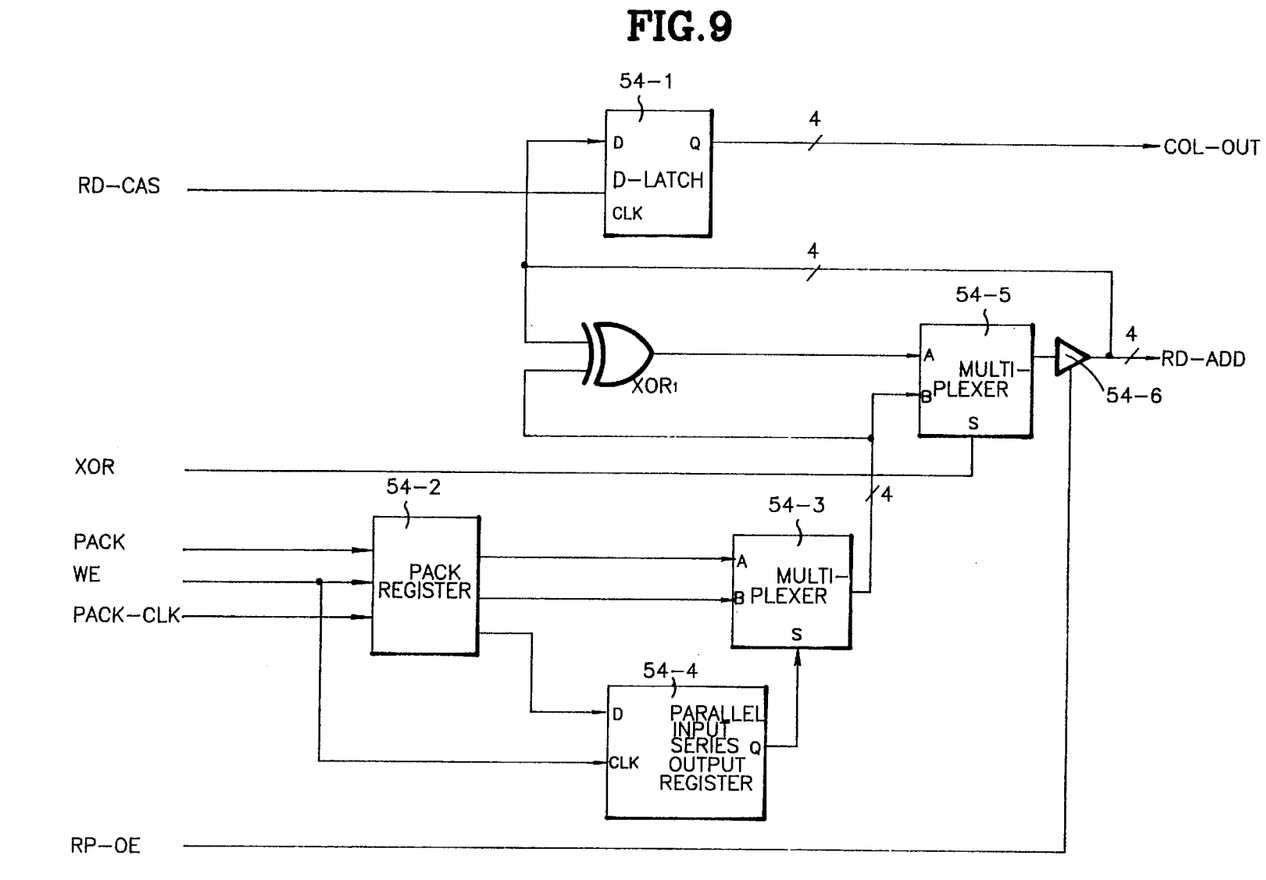
FIG. 9 is detail of the DRAM data interface part of FIG. 6.

As shown in FIG. 9, the DRAM data interface part 54 includes, a D-latch for latching data received from DRAM in response to the read column address strobe signal RD-CAS received from the DRAM reading control part 52 to generate color data COL-OUT, a pack register 54-2 for latching a pack data PACK received from outside in response to the writing enable signal WE received from the DRAM writing control part 51 and a pack clock signal PACK-CLK received from outside, a parallel input series output register 54-4 for changing parallel font signals applied from the pack register 54-2 in response to the pack clock signal PACK-CLK into series font signals, a multiplexer 54-3 for selecting and transmitting one signal of the signals received from the pack register 54-2 in response to the font signal applied from the parallel input series output register 54-4, an exclusive OR gate XOR1 for carrying out exclusive logical summation of the data applied from DRAM and a signal applied from the multiplexer 54-3, a multiplexer 54-5 for selecting and transmitting one signal of the signals received from the multiplexer 54-3 and the exclusive OR gate XOR1 in response to an exclusive OR signal XOR applied from outside, and a 3 state buffer 54-6 for controlling a signal output applied from the multiplexer 54-5 in response to the read output enable signal RD-DE applied from the DRAM reading control part 52.

Operation of the DRAM control device having the foregoing system is to be explained hereinafter.

First, process for generating a writing address for carrying out an operation for writing on DRAM is to be explained hereinafter.

Upon application of a writing signal WR from the instruction decoder 2, data for a font is written on the DRAM, wherein, since one font has, as shown in FIG. 3, 6 pixels in a column and 12 pixels in a row, a DRAM address for one font is not continuous but has periodical offsets in every 6 pixels. And, as shown in FIG. 4, one screen area has 50 pixels in a column, the number of offsets are 50×6=300. Therefore, since the address increases by 300 at every 6 pixels, the writing start address generator 51-1, starting with the writing start address WRST-AD, applies addresses increased by 300 at every 6 pixels to the writing address generation part 51-2.

In this instant, the writing count load part 51-3 has a load signal generated in response to the horizontal synchronization signal HSYNC applied from the timing control part 8, and the writing start address applied from the writing start address generation part 51-1, synchronized to the load signal, loaded on the writing address generation part 51-2. Then, the writing address generation part 51-2, receiving the writing start address applied from the writing start address generator 51-1 and the load signal applied from the writing count load part 51-3, generates a writing address WR-ADD. Upon receiving the writing signal WR and the exclusive OR signal XOR applied from the instruction decoder 2, the writing mode part 51-5 has them synchronized to the horizontal synchronization signal HSYNC and produced into a writing mode signal WR-MODE and a reading/writing mode signal RD/WR-MODE.

A DRAM writing period that is a period writing data on the DRAM is a horizontal synchronization period that is a blanking period of TV signals. Since the data in the DRAM should be read in and presented to a screen, no data can be written on the DRAM except the blanking period. Therefore, the writing mode part 51-5, having been provided to determine that the period to write on the DRAM is to be a period during which the horizontal synchronization signal HSYNC is received after receiving the writing signal WR and the exclusive OR signal XOR, applies the writing mode signal WR-MODE to the writing control part 51-4 during the horizontal synchronization period on reception of the writing signal and the reading/writing mode signal RD/WR-MODE to the reading/writing control part 5-16 during the horizontal synchronization period on reception of the exclusive OR signal XOR.

Accordingly, the writing control part 51-4 controls DRAM control signals, i.e., the writing row address strobe signal WR-RAS, the writing column address strobe signal WR-CAS, and the writing enable signal WE to be transmitted through the relevant gates AD1, AD2 and AD3 matched to the writing address WR-ADD of the writing address generation part 51-2.

Herein, on reception of the exclusive OR signal XOR being a signal to control to read in data from the DRAM and to write the data on the DRAM at the same address again after exclusive logical summation with a pack data, the writing mode part 51-5, enabling the reading/writing mode signal RD/WR-MODE, operates the reading/writing control part 51-6 during the horizontal synchronization period HSYNC.

Upon the reading/writing mode signal RD/WR-MODE being enabled, the reading/writing control part 51-6, thus operated, generates a DRAM control signal, i.e., a writing output enable signal WR-OE, and controls to generate writing row address strobe signal WR-RAS, writing column address strobe signal WR-CAS, and writing enable signal WE.

That is, one group of signals applied from the writing control part 51-4 and the reading/writing control part 51-6 are logically multiplied at the AND gate AD1 to generate a writing row address strobe signal WR-RAS, other group of signals applied from the writing control part 51-4 and the reading/writing control part 51-6 are logically multiplied at the AND gate AD2 to generate a writing column address strobe signal WR-CAS, and another group of signals applied from the writing control part 51-4 and the reading/writing control part 51-6 are logically multiplied at the AND gate AD3 to generate a writing enable signal WE.

And the reading/writing mode signals RD/WR-MODE applied from the writing mode part 51-5 are logically summed at the OR gate OR1 to generate writing signal WRITE. That is, if either the writing mode or the reading/writing mode is enabled, the OR gate OR1 enables and transmits the writing signal WRITE.

Next, a process for generating the writing address for carrying out an operation for writing on the DRAM is to be explained hereinafter.

Upon receiving the reading start address RDST-AD and the scroll signal SCROLL applied from the scroll control part 4 and the vertical synchronization signal VSYNC applied from the timing control part 8, the DRAM reading control part 52 accordingly generates a reading address as well as control signals for reading the DRAM, which is to be explained hereinafter in detail.

The scroll load part 52-1 generates a load signal according to a value of the scroll signal applied from the scroll control part 4 as well as pulse signals on receiving a vertical synchronization signal VSYNC. The load signal and the pulse signal from the scroll load part 52-1 and the pulse generation part 52-3 respectively are applied to, logically summed at and transmitted from the OR gate OR2 to the read address generation part 52-2 at a load terminal thereof.

In this instant, the read address generation part 52-2, having received a reading start address RDST-AD through an input terminal thereof, applies a reading address RD-ADD to the DRAM on receiving a reading signal READ under enable condition from the timing control part 8. And, upon reception of a reading signal READ under enable condition applied from the timing control part 8, the reading control part 52-4 accordingly generates DRAM control signals, i.e., a read row strobe signal RD-RAS, a read column strobe signal RD-CAS, and a read output enable signal RD-OE.

Upon application of the DRAM signals thus generated at the DRAM writing control part 51 and the DRAM reading control part 52 in response to the instruction signals applied from outside to the multiplexer 53 at input terminals A and B thereof, the multiplexer 53 selects and transmits one signal in response to the writing signal WRITE received from the DRAM writing control part 51.

That is, if a horizontal synchronization signal is received when a writing signal WR or an exclusive OR signal XOR is received, a writing signal WRITE is enabled to make the multiplexer 53 select writing control signals applied from the DRAM writing control part 51, i.e., a writing output enable signal WR-OE, a writing row address strobe signal WR-RAS, a writing column address strobe signal WR-CAS, and writing address WR-ADD, generate an address signal ADD, a row address strobe signal RAS, a column address strobe signal CAS, and an output enable signal OE based on the selected signals, and transmit the generated signals to the DRAM.

And, a disabled writing signal WRITE makes the multiplexer 53 select reading control signals received from the DRAM reading control part 52, i.e., a read output enable signal RD-OE, a reading row address strobe signal RD-RAS, a reading column address strobe signal RD-CAS, and reading address RD-ADD, generate an address signal ADD, a row address strobe signal RAS, a column address strobe signal CAS, and an output enable signal OE based on the selected signals, and transmit the generated signals to the DRAM.

The DRAM data interface part 54, normally reading in DRAM data to generate color data COL-OUT, and transmitting data on reception of a writing signal WR or an exclusive OR signal XOR from the instruction decoder 2, generates color data by reading in font data from DRAM in response to the read output enable signal RD-OE and the read column address strobe signal RD-CAS of the DRAM reading control part 52 and transmits data to the input output terminal RAMD with inputs of pack data PACK applied from the error correction part 1 for writing data on DRAM and the pack clock signal PACK-CLK for latching the pack data.

Thus, a process for controlling the reading and writing of DRAM data at the DRAM interface part 54 is to be explained hereinafter in detail.

When the reading output enable signal RD-OE is at low, since the three state buffer 54-6 is disabled, data applied from DRAM to the DRAM data interface part 54 through the input output terminal RAMD is latched at the D-latch 54-1 in response to the read column address strobe signal RD-CAS and generated as color data COL-OUT.

And when the reading output enable signal RD-OE is at high, since the three state buffer 54-6 is enabled, putting the three state buffer 54-6 into a writing condition, the pack data is applied to the DRAM through the input output terminal RAMD. This is done by enabling the three state buffer 54-6 with the instruction decoder 2 that enables a writing signal WR or an exclusive OR signal XOR which makes the read output enable signal RD-OE high, on receiving a pack data PACK applied from the error correction part 1 to the instruction decoder 2 and the DRAM data interface part 54.

The pack data PACK applied from the error correction part 1 is latched at the pack register 54-2 by the pack clock signal PACK-CLK, and applied to the DRAM in response to the writing enable signal WE of the DRAM writing control part 51 after reception of the pack register of the pack data PACK has been completed, and the signals applied from the pack register 54-2 are color signals COL1 and COL2, and a font signal.

The color signals COL1 and COL2 are set at the multiplexer 54-3 according to the pack data PACK, and determined which one of the color signals COL1 and COL2 is to be selected and applied by the font signal.

The 6 bit font signals applied from the pack register 54-2 in parallel are, changed into one bit series signals at the parallel input series output register 54-4 receiving the writing enable signal WE as a clock input, and applied to the multiplexer 54-3 at the selection terminal thereof. If the font signal applied from the parallel input series output register 54-4 is '0', the multiplexer 54-3 selects and applies the color signal COL1, and if the font signal applied from the parallel input series output register 54-4 is '1', the multiplexer 54-3 selects and applies the color signal COL2.

In this instant, if the OR signal XOR is enabled, the signal selected and applied in response to the font signal changed into series at the multiplexer 54-3 is applied to DRAM through the multiplexer 54-5 and the three state buffer 54-6.

That is, if the OR signal XOR is enabled, the signal read in DRAM data from the input output terminal RAMD and the color signals COL1 and COL2 selected through the multiplexer 54-3 are, subjected to an exclusive OR operation at the exclusive OR gate XOR, and applied to the multiplexer 54-5 at the input terminals A and B thereof together with the color signals COL1 and COL2 selected through the multiplexer 54-3, and the multiplexer 54-5 selects the color signals COL1 and COL2 selected through the multiplexer 54-3 in response to the exclusive OR signal XOR and applies to the three state buffer 54-6.

In this instant, if the read output enable signal RD-0E is enabled at high, the signal selected at and applied from the multiplexer 54-5 is applied to the DRAM through the input output terminal RAMD.

As has been explained, this invention has an advantage of permitting a DRAM control device made small by forming it in digital logic favorable for making ASIC, allowing to apply it to a compact disc player as well as laser disc player.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A DRAM control device of a CD graphics decoder comprising:

a DRAM writing control part for generating and applying various writing control signals which generate writing address in a DRAM and control writing on the DRAM according to various instruction signals received from outside;

a DRAM reading control part for generating and applying various reading control signals which generate reading address in the DRAM and control reading in from the DRAM according to various instruction signals received from outside;

a first multiplexer for selecting and applying the writing and reading addresses and the various writing and reading control signals received from the DRAM writing control part and the DRAM reading control part in response to the control signal received from the DRAM writing control part; and, a DRAM data interface part for presenting color data through applying pack data received from outside to the DRAM and receiving the data applied from the DRAM in response to various control signals received from the DRAM writing control part and the DRAM reading control part.

2. The DRAM control device of a CD graphics decoder as claimed in claim 1, wherein the DRAM writing control part includes, a writing start address generator for generating a writing start address at the time of starting according to a writing start address received from outside, and adding an offset address to the writing start address at every predetermined pixel and transmitting the address, a writing count load part for generating load signals loading writing start address on every predetermined pixel using a horizontal synchronization signal received from outside, a writing address generation part for generating a DRAM writing address by loading the writing start address received from the writing start address generator in response to the load signal received from the writing count load part, a writing mode part for generating a writing mode signal indicating writing mode and a reading/writing mode signal indicating reading/writing mode in response to a writing signal and an exclusive OR signal received from outside synchronized to the horizontal synchronization signal, a writing control part for generating a writing control signal controlling writing on DRAM in response to the writing mode signal received from the writing mode part, a reading/writing control part for generating a reading/writing control signal controlling reading/writing of DRAM and a writing output enable signal in response to the reading/writing mode signal received from the writing mode part, and a writing control signal generation part for generating a writing row address strobe signal, a writing column address strobe signal, a writing enable signal, and a writing signal in response to the writing control signal and the reading/writing control signal received from the writing control part and the reading/writing control part, respectively.

3. The DRAM control device of a CD graphics decoder as claimed in claim 2, wherein the writing start address generator generates writing start address at starting according to the writing start address received from outside, and adds an offset address to the writing start address for every pixel corresponding to the number of pixels of one font column and transmits the address.

4. The DRAM control device of a CD graphics decoder as claimed in claim 3, wherein the writing start address generator generates writing start address at starting according to the writing start address received from outside, and adds an offset address to the writing start address for every sixth pixel and transmits the address.

5. The DRAM control device of a CD graphics decoder as claimed in claim 2, wherein the writing count load part generates a load signal for loading writing start address on every pixel corresponding to the number of pixels of one font column according to the horizontal synchronization signal received from outside.

6. The DRAM control device of a CD graphics decoder as claimed in claim 5, wherein the writing count load part generates a load signal for loading writing start address on every sixth pixel according to the horizontal synchronization signal received from outside.

7. The DRAM control device of a CD graphics decoder as claimed in claim 2, wherein the writing control signal generation part includes,

- an OR gate for logical summation of the writing mode signal and the reading/writing mode signal received from the writing mode part,
- a first AND gate for generating a writing row address strobe signal by logical multiplication of the signals received from the writing control part and reading/writing control part,
- a second AND gate for generating a writing column address strobe signal by logical multiplication of the signals received from the writing control part and reading/writing control part, and
- a third AND gate for generating a writing enable signal by logical multiplication of the signals received from the writing control part and reading/writing control part.

8. The DRAM control device of a CD graphics decoder as claimed in claim 1, wherein the DRAM reading control part includes,

- a scroll load part for generating a load signal according to a scroll signal received from outside,
- a pulse generation part for generating a pulse signal in response to a vertical synchronization signal received from outside,
- an OR gate for logical summation of the load signal and the pulse signal received from the scroll load part and the pulse generation part respectively,
- a read address generation part for generating a DRAM reading address using the reading start address received from outside in response to a reading signal received from outside and a signal received from the OR gate, and
- a reading control part for applying a read row address strobe signal, a read column address strobe signal and a read output enable signal to DRAM in response to the reading signal.

9. The DRAM control device of a CD graphics decoder as claimed in claim 1, wherein the DRAM data interface part applies pack data received from outside to DRAM during a DRAM writing period that is a period for carrying out an operation writing on DRAM and transmits color data on receiving data applied from DRAM in response to the control signals received from the DRAM writing control part and the DRAM reading control part.

10. The DRAM control device of a CD graphics decoder as claimed in claim 9, wherein the DRAM writing period is during a horizontal synchronization period that becomes a blanking period.

11. The DRAM control device of a CD graphics decoder as claimed in claim 9, wherein the DRAM data interface part includes,

- a D-latch for latching data received from DRAM in response to the read column address strobe signal received from the DRAM reading control part to generate color data,
- a pack register for latching a pack data received from outside in response to the writing enable signal received from the DRAM writing control part and a pack clock signal received from outside,
- a parallel input series output register for changing parallel font signals applied from the pack register in response to the pack clock signal into series font signals,
- a second multiplexer for selecting and transmitting one of the signals received from the pack register in response to the font signal applied from the parallel input series output register,
- an exclusive OR gate for carrying out exclusive logical summation of the data applied from DRAM and a signal applied from the second multiplexer,
- a third multiplexer 54-5 for selecting and transmitting one of the signals received from the second multiplexer and the exclusive OR gate in response to an exclusive OR signal applied from outside, and
- a 3 state buffer for controlling a signal output applied from the third multiplexer in response to the read output enable signal applied from the DRAM reading control part.

* * * * *